US012065970B2

(12) United States Patent
Lokhandwalla

(10) Patent No.: US 12,065,970 B2
(45) Date of Patent: Aug. 20, 2024

(54) COKE CATCHING SCREEN

(71) Applicant: Hamilton Sundstrand Corporation, Charlotte, NC (US)

(72) Inventor: Murtuza Lokhandwalla, South Windsor, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 279 days.

(21) Appl. No.: 17/508,653

(22) Filed: Oct. 22, 2021

(65) Prior Publication Data
US 2023/0129696 A1    Apr. 27, 2023

(51) Int. Cl.
*F02C 7/22*    (2006.01)
*B01D 35/00*    (2006.01)

(52) U.S. Cl.
CPC ............ *F02C 7/222* (2013.01); *B01D 35/005* (2013.01)

(58) Field of Classification Search
CPC ....... F02C 7/222; B01D 35/005; B01D 29/03; B01D 2029/033; B01D 2201/184; F05D 2260/607
USPC .... 210/416.4, 175, 181, 247, 279, 305, 306, 210/320, 456, 499
See application file for complete search history.

(56) References Cited

U.S. PATENT DOCUMENTS

| 5,113,648 A | 5/1992 | Shekleton et al. |
| 10,112,725 B2 | 10/2018 | Fausett et al. |
| 10,486,167 B2 | 11/2019 | Willigan et al. |
| 10,495,002 B2 | 12/2019 | Cordatos et al. |
| 2011/0030375 A1 | 2/2011 | Bunker |
| 2011/0309013 A1 | 12/2011 | Elder |
| 2014/0069859 A1* | 3/2014 | Hanks ................ B01D 21/0069 210/521 |
| 2016/0047550 A1* | 2/2016 | McBrien ................ F02C 7/222 60/734 |
| 2017/0204746 A1* | 7/2017 | Ryon ..................... B01D 29/58 |
| 2018/0078881 A1 | 3/2018 | Suzuki et al. |

FOREIGN PATENT DOCUMENTS

| CN | 112547148 A | 3/2021 |
| GB | 1553063 A | 9/1979 |
| JP | S53102921 A | 9/1978 |

OTHER PUBLICATIONS

Search Report issued in European Patent Application No. 22201990.3; Application Filing Date Oct. 17, 2022; Date of Mailing Feb. 27, 2023 (5 pages).

* cited by examiner

*Primary Examiner* — Madeline Gonzalez
(74) *Attorney, Agent, or Firm* — CANTOR COLBURN LLP

(57) ABSTRACT

A flow diverter of a coke catching element is provided. The flow diverter includes a body disposable in a flow field and defining an interior, an upstream end, which is defined relative to the flow field, and a downstream end, which is downstream from the upstream end. At least one of the upstream end and the downstream end is open to the interior and the other of the upstream end and the downstream end is closed. The interior diverges at the one of the upstream end and the downstream end that is open and converges at the other of the upstream end and the downstream end.

12 Claims, 2 Drawing Sheets

COKE CATCHING SCREEN

BACKGROUND

The present disclosure relates to fuel systems and, more particularly, to a coke catching screen for a fuel system of an aircraft.

In a typical aircraft, fuel flows from a tank and through a fuel system that conditions (pressure/temperature/filter) and meters the fuel flow. Fuel nozzles spray the fuel into one or more combustion chambers that each have intricate and small passages or orifices to obtain a desired degree of fuel distribution and atomization in the one or more combustion chambers.

With such fuel systems, there is often a likelihood that debris and/or contaminants could be generated in the fuel system upstream of the fuel nozzles. Hence, a last chance screen is utilized, just before the fuel nozzles. This last chance screen serves to screen at least some of the debris and/or contaminants from the fuel flow and thereby protects passages in the fuel nozzles from becoming clogged.

It has been seen, however, that the last chance screens are themselves susceptible to clogging. This can be due to the small size of the openings of the last chance screens and due to exposure to high fuel temperatures resulting from proximity to the engine.

BRIEF DESCRIPTION

According to an aspect of the disclosure, a flow diverter of a coke catching element is provided. The flow diverter includes a body disposable in a flow field and defining an interior, an upstream end, which is defined relative to the flow field, and a downstream end, which is downstream from the upstream end. At least one of the upstream end and the downstream end is open to the interior and the other of the upstream end and the downstream end is closed. The interior diverges at the one of the upstream end and the downstream end that is open and converges at the other of the upstream end and the downstream end.

In accordance with additional or alternative embodiments, the upstream end is open and the downstream end is closed and the body includes a leading edge at the upstream end, a trailing edge at the downstream end and interior and exterior corners axially interposed between the leading and trailing edges. The body increases in thickness from the leading edge to the interior and exterior corners and decreases in thickness from the interior and exterior corners to the trailing edge.

In accordance with additional or alternative embodiments, a low friction coating coats the body.

According to another aspect of the disclosure, a coke catching element is provided and includes flow diverters arranged in a flow field to form an intervening space with converging and diverging sections. At least one of the flow diverters includes a body defining an interior with upstream and downstream ends defined relative to the flow field. The upstream and downstream ends are open and closed, respectively, or closed and open, respectively, to form a stagnant, recirculating flow in the interior via the open one of the upstream and downstream ends to promote coke deposition in the interior at the closed one of the upstream and downstream ends while maintaining a minimal pressure drop in the intervening space.

In accordance with additional or alternative embodiments, the flow diverters include at least first and second flow diverters arranged side-by-side in the flow field and the at least first and second flow diverters form the intervening space with a converging section and a diverging section downstream from the converging section or with a diverging section and a converging section downstream from the diverging section.

In accordance with additional or alternative embodiments, each of the flow diverters includes the body defining the interior with the upstream and downstream ends defined relative the predominant direction of flow in the flow field.

In accordance with additional or alternative embodiments, the interior diverges at the upstream end and converges at the downstream end or the interior converges at the upstream end and diverges at the downstream end.

In accordance with additional or alternative embodiments, a low friction coating coats the body of each of the flow diverters.

According to another aspect of the disclosure, a fuel system is provided and includes an engine, a fuel tank to supply fuel to the engine and a coke catching element interposed between the fuel tank and the engine. The coke catching element includes screening media to screen fuel supplied to the engine. The screening media includes flow diverters arranged to form intervening spaces. At least one of the flow diverters includes a body defining an interior with upstream and downstream ends. The upstream and downstream ends are open and closed, respectively, or closed and open, respectively, to form a stagnant, recirculating flow in the interior via the open one of the upstream and downstream ends to promote coke deposition in the interior at the closed one of the upstream and downstream ends while maintaining a minimal pressure drop in the intervening space.

In accordance with additional or alternative embodiments, the fuel system further includes at least one of a fuel conditioner or flow meter fluidly interposed between the fuel tank and the coke catching element and a fuel nozzle fluidly interposed between the coke catching element and the engine.

In accordance with additional or alternative embodiments, the fuel system further includes at least one of a last chance screen and a heat exchanger. The coke catching element is a component of the at least one of the last chance screen and the heat exchanger.

In accordance with additional or alternative embodiments, the coke catching element includes a frame on which the screening media is supported.

In accordance with additional or alternative embodiments, each flow diverter includes a body disposable in a flow field of the fuel supplied to the engine and defining the interior, an upstream end, which is defined relative to the flow field and a downstream end, which is downstream from the upstream end. At least one of the upstream end and the downstream end is open to the interior and the other of the upstream end and the downstream end is closed and the the interior diverges at the one of the upstream end and the downstream end that is open and converges at the other of the upstream end and the downstream end.

In accordance with additional or alternative embodiments, the upstream end is open and the downstream end is closed and the body includes a leading edge at the upstream end, a trailing edge at the downstream end and interior and exterior corners axially interposed between the leading and trailing edges. The body increases in thickness from the leading edge to the interior and exterior corners and the body decreases in thickness from the interior and exterior corners to the trailing edge.

In accordance with additional or alternative embodiments, the flow diverters include at least first and second flow diverters arranged side-by-side in a flow field of the fuel supplied to the engine.

In accordance with additional or alternative embodiments, each of the intervening spaces has a converging section and a diverging section downstream from the converging section or a diverging section and a converging section downstream from the diverging section.

In accordance with additional or alternative embodiments, the screening media includes a first column of flow diverters and a second column of flow diverters downstream from the first stage.

In accordance with additional or alternative embodiments, the second stage of flow diverters is staggered relative to the first stage of flow diverters.

In accordance with additional or alternative embodiments, a low friction coating to coat each of the flow diverters.

In accordance with additional or alternative embodiments, a minimum width of the intervening spaces is about 0.1 mm.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

The presence of radicals (highly reactive species that tend to react with other species) in jet fuels tend to react with oxygen dissolved in fuel and to thus form insoluble carbonaceous deposits—aka 'coking'—on fuel system surfaces. Coking reactions are accelerated at higher temperatures (e.g., temperatures at or greater than about 300° F.) and tend to make conventional last chance screens of fuel systems and therefore downstream components highly vulnerable to coking. Further, with increasing cooling demands and the drive to improve engine thermal efficiency, there is a push to increase fuel temperatures beyond 300° F. This could aggravate the coking situation.

Thus, as will be described below, a coke catching element applied to a screen, a header of a heat exchanger or another device is provided. The coke catching element can be formed as a sacrificial flow element or as a replaceable element that accumulates coking deposits in a fuel system while maintaining a low pressure drop and thus eliminates or at least substantially minimizes or reduces coke deposits on downstream elements. The coke catching element has a converging-diverging section with openings at the upstream end and/or downstream end and cavities to ingest stagnant/recirculating flow regions. This configuration accumulates coking deposits in the cavity while maintaining a minimal pressure drop. In some cases, a series (multiple) of such coke-catching elements can be envisioned to sample an entire flow field.

Figure 1:
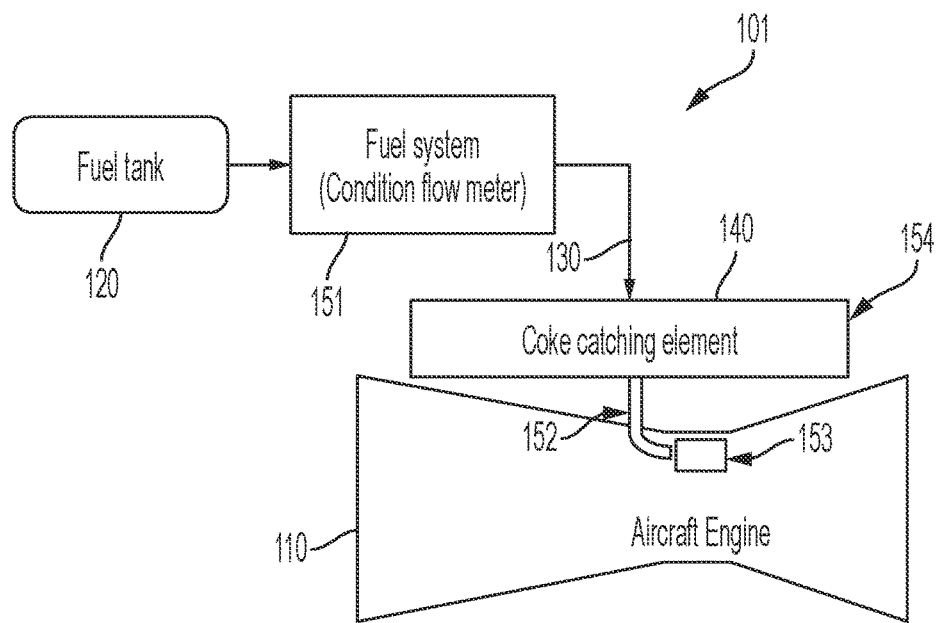
FIG. 1 is a schematic diagram of a fuel system in accordance with embodiments.

With reference to FIG. 1, a fuel system 101 is provided for use in an aircraft for example. The fuel system 101 includes an engine 110, such as a gas turbine engine, a fuel tank 120 to supply fuel to the engine 110 via a conduit 130 and a coke catching element 140. The coke catching element 140 is fluidly interposed between the fuel tank 120 and the engine 110 and is disposed along the conduit 130. The fuel system 101 can further include at least one of a fuel conditioner or flow meter 151, which is fluidly interposed between the fuel tank 120 and the coke catching element 140, and a fuel nozzle 152, which is fluidly interposed between the coke catching element 140 and the engine 110 and which is configured to spray fuel into a combustor 153 of the engine 110. In addition, the fuel system 101 can include a device 154, such as at least one of a last chance screen and/or a header of a heat exchanger. The coke catching element 140 can be a component of the device 154.

Figure 2:
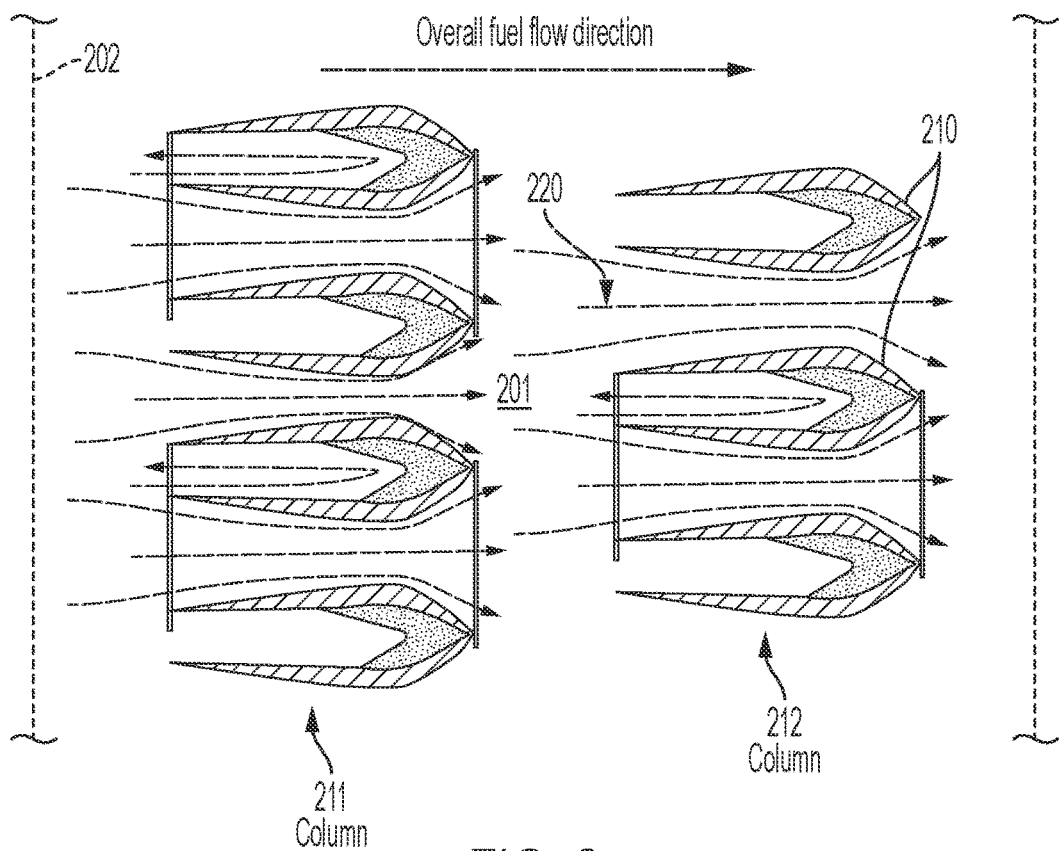
FIG. 2 is a side schematic view of a coke catching element of a fuel system in accordance with embodiments.

With reference to FIG. 2, the coke catching element 140 of FIG. 1 can be additively manufactured and can include screening media 201, which is configured to screen fuel that is supplied to the engine 110 of FIG. 1, and a frame 202 on which the screening media 201 is supported. As shown in FIG. 2, the screening media 201 includes flow diverters 210 arranged to form intervening spaces 220. In accordance with embodiments, the flow diverters 210 can be arranged in a column 211 with the intervening spaces 220 interleaved between adjacent flow diverters 210 in the column 211 and, in accordance with further embodiments, the flow diverters 210 can be arranged in at least first and second columns 211 and 212 (both with intervening spaces 220 interleaved between adjacent flow diverters 210) where the second column 212 is downstream from the first column 211. In these or other cases, the second column 212 can be staggered or offset from the first column 211 so as to ensure that a significant fraction of fuel in the fuel flow can be filtered or screened. In accordance with still further embodiments, one or more of the flow diverters 210 can be coated with a low-friction coating 213 (see FIG. 3), such as PTFE or another similar coating material.

Figure 3:
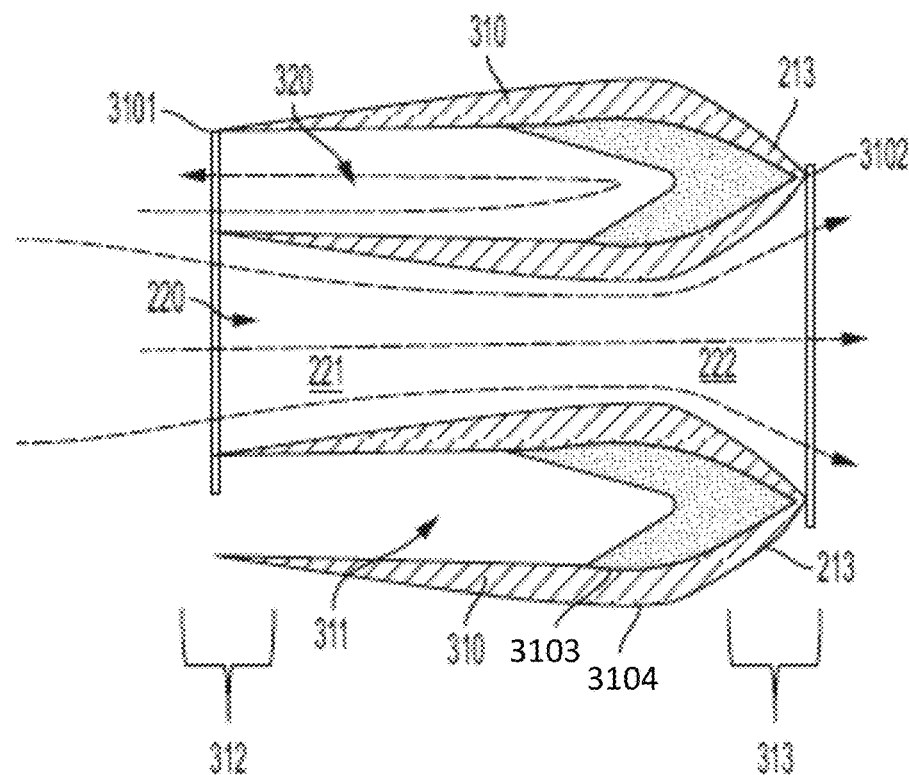
FIG. 3 is an enlarged side schematic view of flow diverters of the coke catching element of FIG. 2 in accordance with embodiments.

With continued to reference to FIGS. 1 and 2 and with additional reference to FIG. 3, at least one or more of the flow diverters 210 (hereinafter, the description will refer to the non-limiting example in which all of the flow diverters 210 have generally similar shapes, sizes and configurations) includes a body 310 that is disposable in a flow field of the fuel being supplied to the engine 110 (see FIG. 1). The body 310 is formed to define an interior 311 with an upstream end 312, which is open to the interior 311, and a downstream end 313, which is closed. The upstream end 312 and the downstream end 313 are defined relative to a predominant direction of fuel flow in the flow field. The interior 311 diverges at the upstream end 312 and converges at the downstream end 313. The body 310 includes a leading edge 3101 at the upstream end 312, a trailing edge 3102 at the downstream end 313 and interior corners 3103 and exterior corners 3104 that are axially interposed between the leading edge 3101 and the trailing edge 3102. The body 310 increases in thickness from the leading edge 3101 to the interior corners 3103 and the exterior corners 3104. The body 310 decreases in thickness from the interior corners 3101 and the exterior corners 3104 to the trailing edge 3102.

With the construction described above, the flow diverters 210 form a stagnant, recirculating flow 320 in the interior 311 via the opening of the upstream end 312 which cannot escape given the closed state of the downstream end 313. The stagnant, recirculating flow 320 increases residence time of fuel flows in the interior 311 to thereby promote coke deposition in the interior 311 at least at the downstream end 313. In the meantime, the configurations of the flow diverters 210 are such that the intervening spaces 220 each have a converging section 221 and a diverging section 222 downstream from the converging section 221 with a minimum width of about 0.1 mm. Therefore, once the stagnant, recirculating flow 320 is created in the interior 311, the converging section 221 and the diverging section 222 contribute to maintaining a minimal pressure drop in any of the intervening spaces 220.

Figure 4:
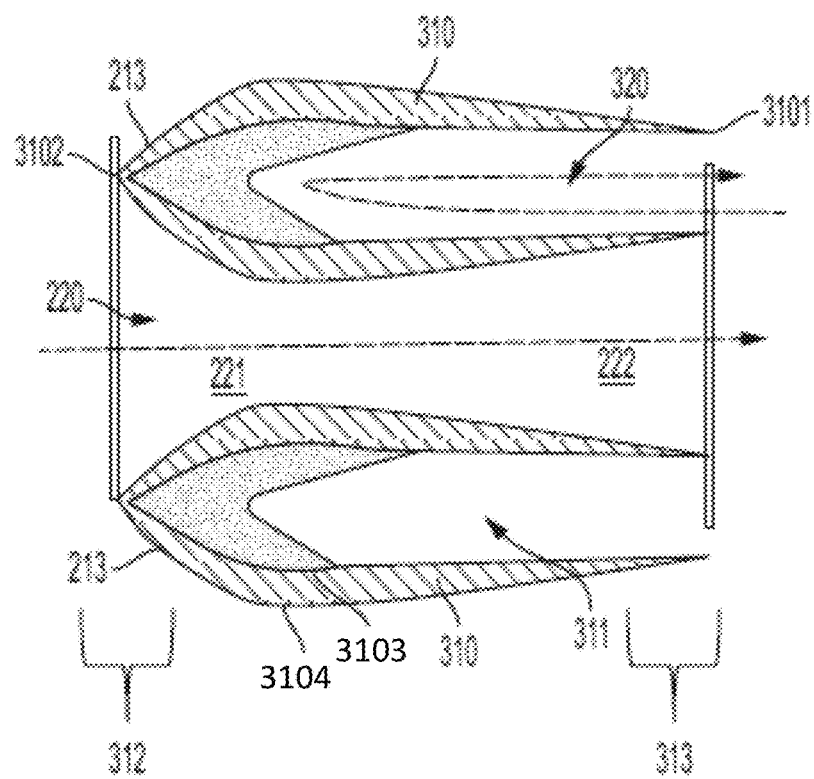
FIG. 4 is an enlarged side schematic view of flow diverters of the coke catching element of FIG. 2 in accordance with alternative embodiments.

Although the description provided above refers to a configuration in which the upstream end 312 is open and the downstream end 313 is closed, it is to be understood that this configuration is not required and that other configurations are possible. For example, with reference to FIG. 4 and in accordance with some embodiments, the upstream end 312 can be closed and the downstream end 313 can be open. In these or other cases, recirculation could occur in a reverse direction as compared to when the upstream end 312 is open and the downstream end 313 is closed. In accordance with still other embodiments, the flow diverters 210 can be oriented transversely (e.g., perpendicularly, or nearly perpendicularly) in relation to a predominant direction of the flow of fluid through the screening media 201.

The configuration of the embodiments in which the upstream end 312 can be closed and the downstream end 313 can be open or in which the flow diverters 210 are oriented transversely will be readily apparent to one skilled in the art and need not be described in greater detail.

In accordance with further embodiments, whichever of the upstream end 312 and the downstream end 313 is closed can have partial openings that allow a relatively small amount of fluid flow through in certain instances or controllable openings that can be opened or closed based on certain (i.e., clean, non-coking conditions during which the risk of coking is limited). Similarly, whichever of the upstream end 312 and the downstream end 313 is open can be controllably opened or closed based on certain (i.e., heavily coked conditions during which recirculation may be of limited usefulness).

Technical effects and benefits of the present disclosure are the provision of a coke catching screen for a fuel system that has an overall converging-diverging shape to minimize pressure drop in the fuel flowing through the fuel system and a cavity to capture coke deposits without impacting fuel pressures. The coke catching screen is designed to be sacrificial or as a replaceable unit once it is filled with deposits and serves to prevent or at least minimize or substantially reduced coke deposition on downstream fuel system elements.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:
1. A flow diverter of a coke catching element, comprising:
a body disposable in a flow field and defining an interior;
an upstream end, which is defined relative to the flow field; and
a downstream end, which is downstream from the upstream end,
wherein:
at least one of the upstream end and the downstream end is open to the interior and the other of the upstream end and the downstream end is closed, and
the interior diverges at the one of the upstream end and the downstream end that is open and converges at the other of the upstream end and the downstream end,
wherein the upstream end is open and the downstream end is closed and the body comprises:
a leading edge at the upstream end;
a trailing edge at the downstream end; and
interior and exterior corners axially interposed between the leading and trailing edges,
wherein the body increases in thickness from the leading edge to the interior and exterior corners and decreases in thickness from the interior and exterior corners to the trailing edge.
2. The flow diverter according to claim 1, further comprising a low friction coating to coat the body.
3. A fuel system, comprising:
an engine;
a fuel tank to supply fuel to the engine; and
a coke catching element interposed between the fuel tank and the engine, the coke catching element comprising screening media to screen fuel supplied to the engine, the screening media comprising:
flow diverters arranged to form intervening spaces,
at least one of the flow diverters comprising a body defining an interior with upstream and downstream ends,
the upstream and downstream ends being open and closed, respectively, or closed and open, respectively, to form a stagnant, recirculating flow in the interior via the open one of the upstream and downstream ends to promote coke deposition in the interior at the closed one of the upstream and downstream ends, which prevents fluid flow therethrough, while maintaining a minimal pressure drop in the intervening space,
wherein each flow diverter comprises a body disposable in a flow field of the fuel supplied to the engine and defining the interior, an upstream end, which is defined relative to the flow field and a downstream end, which is downstream from the upstream end,
wherein:

at least one of the upstream end and the downstream end is open to the interior and the other of the upstream end and the downstream end is closed, the interior diverges at the one of the upstream end and the downstream end that is open and converges at the other of the upstream end and the downstream end, the upstream end is open and the downstream end is closed and the body comprises a leading edge at the upstream end, a trailing edge at the downstream end and interior and exterior corners axially interposed between the leading and trailing edges, wherein:

the body increases in thickness from the leading edge to the interior and exterior corners and the body decreases in thickness from the interior and exterior corners to the trailing edge such that, in intervening spaces between the flow diverters, converging and diverging sections are formed to maintain a minimal pressure drop therein.

4. The fuel system according to claim 3, further comprising at least one of:

a fuel conditioner or flow meter fluidly interposed between the fuel tank and the coke catching element; and a fuel nozzle fluidly interposed between the coke catching element and the engine.

5. The fuel system according to claim 3, further comprising at least one of a last chance screen and a heat exchanger, wherein the coke catching element is a component of the at least one of the last chance screen and the heat exchanger.

6. The fuel system according to claim 3, wherein the coke catching element comprises a frame on which the screening media is supported.

7. The fuel system according to claim 3, wherein the flow diverters comprise at least first and second flow diverters arranged side-by-side in a flow field of the fuel supplied to the engine.

8. The fuel system according to claim 3, wherein each of the intervening spaces has a converging section and a diverging section downstream from the converging section or a diverging section and a converging section downstream from the diverging section.

9. The fuel system according to claim 3, wherein the screening media comprises:

a first column of flow diverters; and a second column of flow diverters downstream from the first column of flow diverters.

10. The fuel system according to claim 9, wherein the second column of flow diverters is staggered relative to the first column of flow diverters.

11. The fuel system according to claim 9, further comprising a low friction coating to coat each of the flow diverters.

12. The fuel system according to claim 3, wherein a minimum width of the intervening spaces is about 0.1 mm.

* * * * *